(12) United States Patent
Goldberg et al.

(10) Patent No.: US 12,051,239 B2
(45) Date of Patent: Jul. 30, 2024

(54) ITEM LOCATION TRACKING VIA IMAGE ANALYSIS AND PROJECTION

(71) Applicant: Disney Enterprises, Inc., Burbank, CA (US)

(72) Inventors: Evan M. Goldberg, Burbank, CA (US); Mark R. Mine, Santa Clarita, CA (US); Matthew Deuel, Playa Vista, CA (US); Daniel L. Baker, Los Angeles, CA (US); Dane M. Coffey, Burbank, CA (US); Steven M. Chapman, Dos Vientos Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 345 days.

(21) Appl. No.: 16/990,756

(22) Filed: Aug. 11, 2020

(65) Prior Publication Data

US 2022/0051013 A1    Feb. 17, 2022

(51) Int. Cl.
| | |
|---|---|
| *G06V 20/00* | (2022.01) |
| *G06T 7/20* | (2017.01) |
| *G06V 10/40* | (2022.01) |
| *G08B 5/22* | (2006.01) |
| *G08B 5/36* | (2006.01) |

(52) U.S. Cl.
CPC ............... *G06V 20/00* (2022.01); *G06T 7/20* (2013.01); *G06V 10/40* (2022.01); *G08B 5/22* (2013.01); *G08B 5/36* (2013.01)

(58) Field of Classification Search
CPC ........ G06V 20/00; G06V 20/52; G06V 10/40; G06V 10/62; G06V 2201/07; G06T 7/20; G06T 7/70; G06T 19/006; G08B 5/22; G08B 5/36; G08B 13/1481; G08B 21/24
See application file for complete search history.

(56) References Cited

U.S. PATENT DOCUMENTS

| | | | |
|---|---|---|---|
| 9,558,563 B1 * | 1/2017 | Kamarshi | ................. G06T 7/20 |
| 9,652,737 B1 | 5/2017 | Wasilewsky et al. | |
| 9,852,397 B2 | 12/2017 | Wasilewsky et al. | |
| 10,089,601 B2 | 10/2018 | Wasilewsky et al. | |
| 10,147,210 B1 | 12/2018 | Desai et al. | |

(Continued)

FOREIGN PATENT DOCUMENTS

| | | | |
|---|---|---|---|
| CN | 110031909 A | * | 7/2019 |
| JP | 2009048428 A | * | 3/2009 |

(Continued)

OTHER PUBLICATIONS

Translated Version of JP2009048428 (Year: 2009).*

(Continued)

*Primary Examiner* — Carol Wang
(74) *Attorney, Agent, or Firm* — Dorsey & Whitney LLP

(57) ABSTRACT

Tracking an item of interest through an environment is described. Tracking the item of interest through the environment is accomplished using passive optical tracking where an item is identified in an image of the environment using image processing and various locations of the item are tracked through the environment. When a user wants to (Continued)

know an item's location, a location image is projected onto the location of the item to allow a user view a current location of the item.

21 Claims, 13 Drawing Sheets

(56) References Cited

U.S. PATENT DOCUMENTS

| | | | |
|---|---|---|---|
| 10,496,905 | B2 | 12/2019 | Solomon et al. |
| 10,535,146 | B1 | 1/2020 | Buibas et al. |
| 10,572,757 | B2 | 2/2020 | Graham et al. |
| 10,574,945 | B1 | 2/2020 | Seyfi et al. |
| 10,706,699 | B1 | 7/2020 | Kerzner et al. |
| 2011/0081048 | A1 | 4/2011 | Woo et al. |
| 2014/0044305 | A1* | 2/2014 | Scavezze ............ H04W 68/005 382/103 |
| 2016/0133057 | A1 | 5/2016 | Kaino et al. |
| 2016/0232777 | A1* | 8/2016 | Jedwab .................. G08B 31/00 |
| 2017/0053437 | A1 | 2/2017 | Ye et al. |
| 2017/0124770 | A1 | 5/2017 | Vats |
| 2017/0249745 | A1* | 8/2017 | Fiala ...................... A63F 13/65 |
| 2018/0173404 | A1 | 6/2018 | Smith |
| 2018/0268611 | A1 | 9/2018 | Nourai et al. |
| 2018/0357600 | A1 | 12/2018 | Wasilewsky et al. |
| 2019/0235636 | A1 | 8/2019 | Marcolina et al. |
| 2019/0266798 | A1 | 8/2019 | Ngai et al. |
| 2019/0278995 | A1 | 9/2019 | Mine et al. |
| 2019/0282324 | A1* | 9/2019 | Freeman ........... A61M 16/0084 |
| 2019/0369722 | A1* | 12/2019 | Lehtiniemi ........... G06F 3/0304 |
| 2021/0334749 | A1* | 10/2021 | Blohm .................. G06T 11/00 |

FOREIGN PATENT DOCUMENTS

| | | | |
|---|---|---|---|
| JP | 2010049296 A | * | 3/2010 |
| JP | 2019219766 A | | 12/2019 |
| KR | 20130119473 | * | 10/2013 |
| WO | 2020006553 A1 | | 1/2020 |

OTHER PUBLICATIONS

Translated Version of JP2010049296 (Year: 2010).*
Translated Version of CN110031909 (Year: 2019).*
Translation of KR20130119473 (Year: 2013).*
Pinhanez, Claudio. "Augmenting reality with projected interactive displays." In Virtual and Augmented Architecture (VAA'01) Proceedings of the International Symposium on Virtual and Augmented Architecture (VAA'01), Trinity College, Dublin, Jun. 21-22, 2001, pp. 93-100. Springer London, 2001. (Year: 2001).*
UK Intellectual Property Office, Combined Search and Examination Report under Sections 17 and 18(3) for Application GB2111535.7 dated Apr. 7, 2022.
Ayn de Jesus, "Artificial Intelligence in Groceries and Produce—4 Current Application Areas", published Feb. 13, 2019, © 2020 Emerj—Artificial Intelligence Research and Insight, 10 pages, <https://emerj.com/ai-sector-overviews/artificial-intelligence-in-groceries-and-produce-current-applications/>.
Dimitrov, Kanio et al., "Towards a World of Totally Identified Objects", IEEE, 2009, pp. 83-88.
Tsai, Tiffany, "Augmented reality is conquering new frontiers with Star Wars", Mar. 3, 2016, 2 pages.

* cited by examiner

ITEM LOCATION TRACKING VIA IMAGE ANALYSIS AND PROJECTION

BACKGROUND

Locations of small or frequently moved physical items are often hard to track over time. These items are commonly lost or misplaced for a myriad of reasons. For example, common household items such as keys and remote controls are often placed in a variety of different locations at varying times of the day. These items may also be moved by multiple people such that is difficult for someone to locate the item at any given time.

Solutions for locating these physical items often rely on actively tagging the item with a location transmitter or other hardware device that can be used to locate the item. These solutions require that the item be tagged with additional hardware and that the additional hardware be working. This additional hardware can often fail to function properly when the item is covered or out of range of a receiving device, etc. These active processes and hardware can often render the item hard to find and leave a user still searching for the misplaced item.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example embodiment includes a method. The method includes receiving an image of a physical environment, identifying, from the image, an item of interest in the physical environment, determining, from the image, a first location of the item of interest within the physical environment, tracking the location of the item of interest within the physical environment over a period of time, and projecting, using a projector, a location image into the physical environment that indicates to a user a current location of the item of interest. Other embodiments of this aspect include corresponding computer systems, apparatus, and computer programs recorded on one or more computer storage devices, each configured to perform the actions of the methods.

Another example embodiment includes a system including a processor and a memory. The memory may include instructions which, when executed on the processor, performs an operation. The operation may include: receiving an image of a physical environment, identifying, from the image, an item of interest in the physical environment from the image, determining, from the image, a first location of the item of interest within the physical environment, tracking a location of the item of interest within the physical environment over a period of time, and projecting, using a projector, a location image into the physical environment that indicates to a user a current location of the item of interest.

Another example embodiment includes a computer-readable storage medium which may include computer-readable program code embodied therewith. The computer-readable program code is configured to perform, when executed by a processor, an operation. The operation may include receiving an image of a physical environment, identifying, from the image, an item of interest in the physical environment from the image, determining, from the image, a first location of the item of interest within the physical environment, tracking a location of the item of interest within the physical environment over a period of time, and projecting, using a projector, a location image into the physical environment that indicates to a user a current location of the item of interest.

BRIEF DESCRIPTION OF THE DRAWINGS

So that the manner in which the above recited aspects are attained and can be understood in detail, a more particular description of embodiments described herein, briefly summarized above, may be had by reference to the appended drawings. It is to be noted, however, that the appended drawings illustrate typical embodiments and are therefore not to be considered limiting; other equally effective embodiments are contemplated.

DETAILED DESCRIPTION

As described above, it is often difficult to track the locations of items that are frequently used and moved. For example, keys, remotes, glasses, and a myriad of other common household items are frequently misplaced by users since these items are frequently used and moved from place to place. Other examples of hard to track/locate items include items on production sets (including television or movie sets) where multiple shots of the same scene may be taken repeatedly over the course of several days or weeks. Tracking locations and configurations of items including both easily movable and stationary items on a production set is a time consuming and detail oriented task. Failure to adequately track these items can cause continuity errors in the final film which degrades the viewing experience.

Some solutions exist to address these problems including various types of hardware or tags that are added to the item of interest. For example, radio-frequency identification (RFID) tags, global positioning system (GPS) tags, and various internet-of-things devices (using Bluetooth and other communication protocols) have been proposed and are attached to items of interest. However, these additional pieces of hardware are not guaranteed to stay attached to the item and can often fail to function properly if the item is covered or out of range of a receiver associated with tag. Relying on physical devices connected to the items of interest can often lead a user to still search for the item. Additionally, these solutions often fail to track an item over time and instead rely on a user to actively begin searching for the item in order to determine the location of the item.

The systems and methods described herein provide for tracking an item of interest through an environment using passive optical tracking where an item is identified in an image of the environment and various locations of the item are tracked through the environment. When a user wants to know an item's location, a location image is projected onto the location of the item to allow a user to quickly and efficiently view the current location of the item.

Figure 1A:
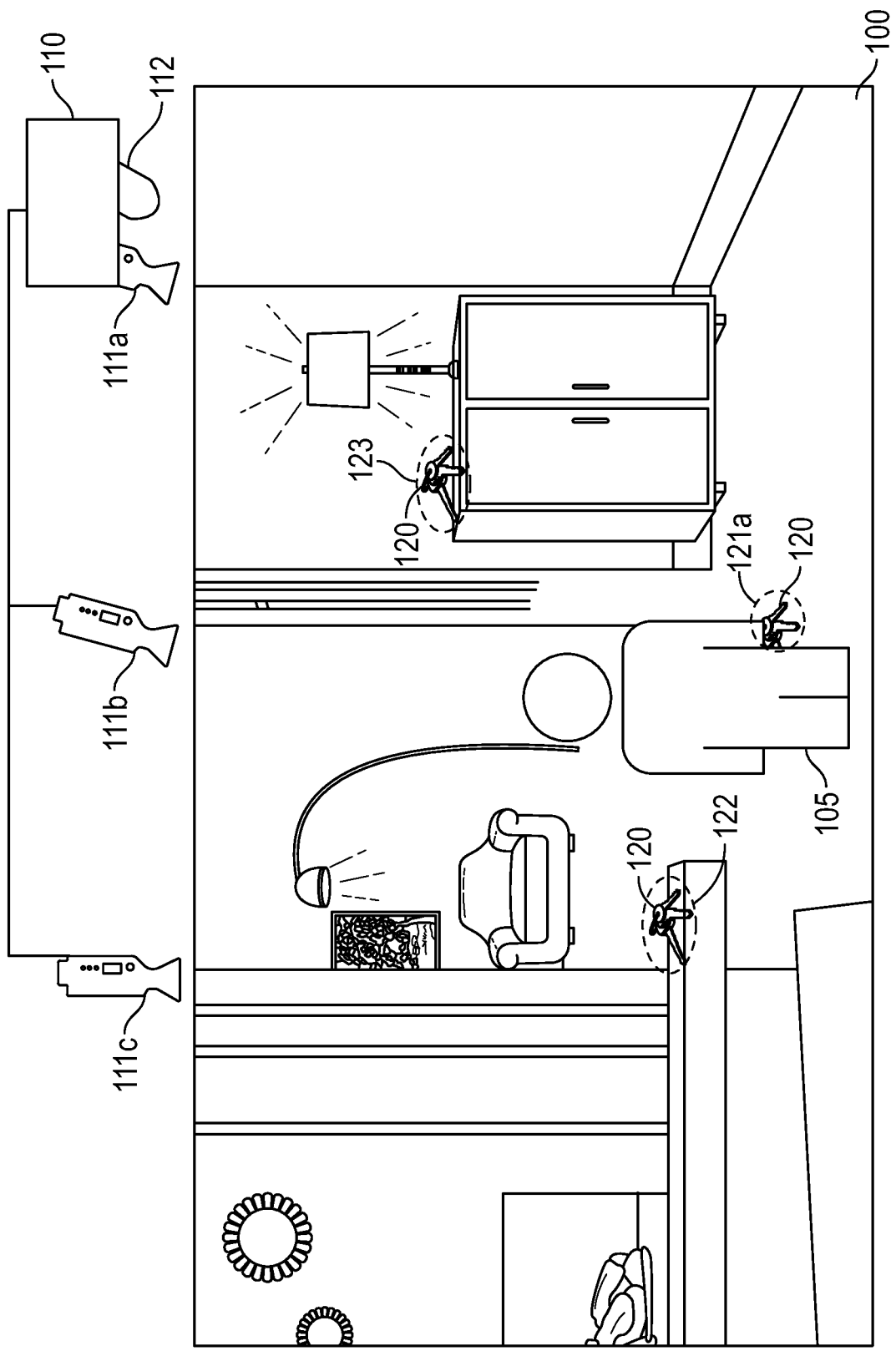
FIGS. 1A-1B illustrate an example environment with an image projection system and an item of interest, according to embodiments described herein.
Figure 1B:
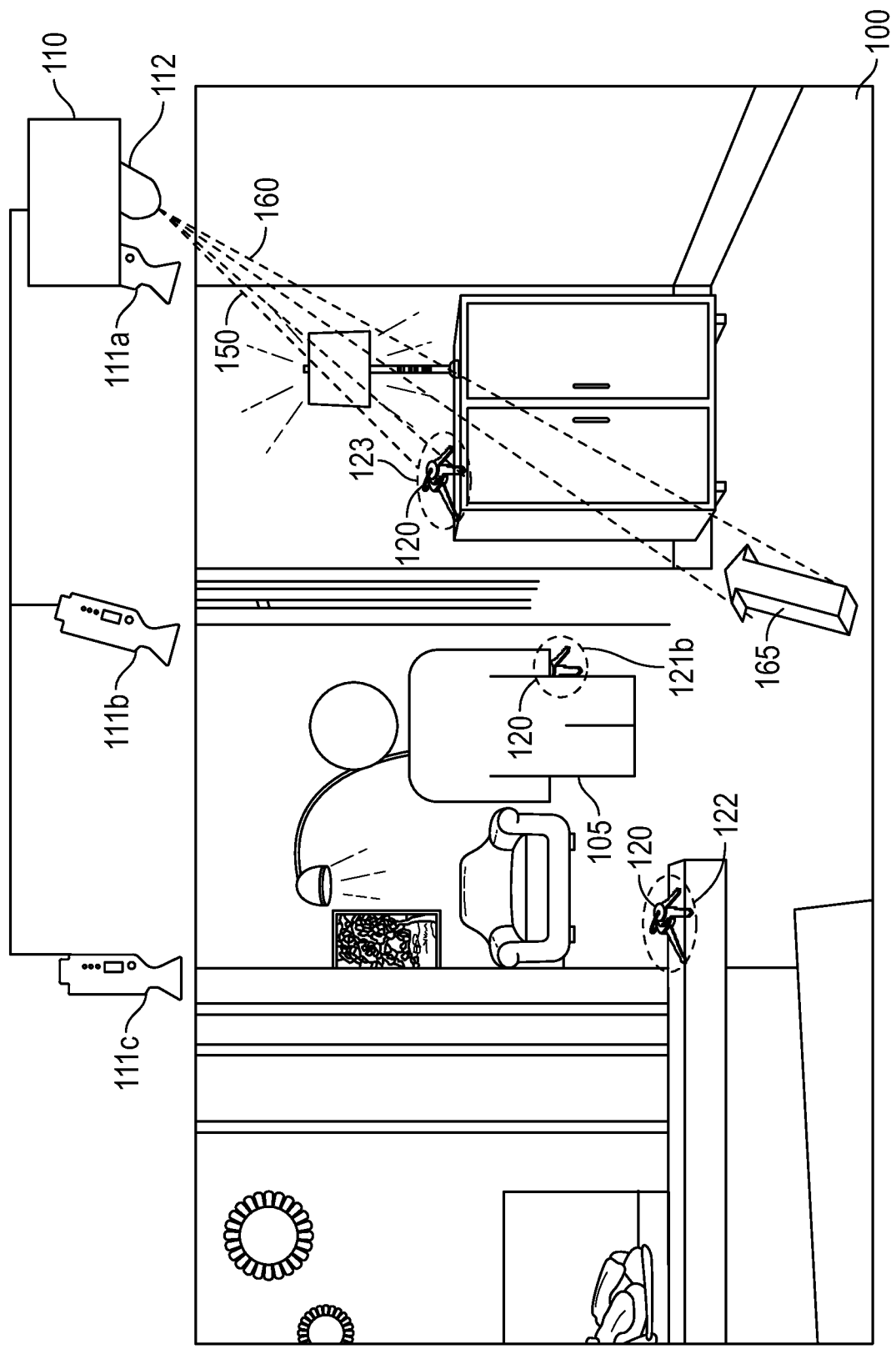

FIGS. 1A-1B illustrate an example environment with an image projection system, system 110, and an item of interest, according to embodiments described herein. With reference to FIG. 1A, the image projection system (hereinafter the "system 110") includes a projector 112 and at least one image sensor such as camera 111a, where the camera 111a is co-located with the projector 112 within the system 110. This colocation may include an example where both the camera 111a and the projector 112 are located within a same housing (e.g., an all-in-one device). In another example, the colocation may include where the camera 111a and the projector 112 are located in close proximity to each other within the environment 100 and are in communication with the system 110.

In some examples, the projector 112 (which is mounted above the physical environment) includes various bulbs and other lighting sources which project light onto physical surfaces in the environment 100 in order to display two dimensional (2D) and three dimensional (3D) images within the environment 100. The camera 111a includes at least one image sensor or other image capturing device(s) that captures still images and/or moving images (e.g., video) of the environment 100. In some examples, the system 110 also includes camera 111b and/or camera 111c, which are remote from the system 110 and situated in or around the environment 100 in order to provide additional views of the environment 100 to the system 110. For example, the camera 111a captures images of the item of interest 120 from one view (a first view), but the cameras 111b and 111c allow for additional views (e.g., from a second view and a third view, respectively) of the item of interest 120 in the environment 100.

In some examples, the item of interest 120 is an item that a user 105 wants to track within the environment 100. For example, the item of interest 120 may be a household item that frequently changes location (e.g., keys, remote control, glasses, pet leash, mobile device, wallet, purse, etc.). For example, the user 105 has the item of interest 120, depicted as a set of keys in FIGS. 1A and 1B, which the user would like to track. In some examples, the system 110 includes an item of interest data store with a set of predetermined items that should be tracked. The predetermined items may include common household items or other predetermined items according to a given setting of the environment 100. For example, when the environment 100 is a gameplay environment, the item of interest data store includes a set of predetermined items that include various game pieces that may be present in the environment 100.

In another example, the interest data store may include user defined items of interest. For example, the user 105 may interact with the system 110 to add an item (e.g., item of interest 120) to the interest data store such that the system 110 tracks the item of interest. In some examples, the user 105 interacts directly with the system 110 via voice or other inputs to the system 110. In another example, the system 110 is in communication with a user device associated with the user 105, where the user 105 inputs items of interest and selects various settings and other information for the system 110 via the user device.

The system 110 tracks the location of the item of interest 120 in the environment 100 using images received from the cameras 111a-111c. For example, at a first time, the user 105 has possession of the item of interest 120 at location 121a. The system 110 stores the location 121a with the item of interest 120. Over a period of time the user 105 places the item of interest 120 at the location 122 (e.g., at a second time after the first time), and which is then moved to the location 123 by either the user 105 or another person (e.g., at a third time after the first and second times). The system 110 receives subsequent or additional images of the environment 100 from the cameras 111a-111c and determines the updated locations (i.e., the locations 122 and 123) of the item of interest 120 and stores the updated locations of the item of interest. The changing locations of the item of interest may leave the user 105 searching for the item of interest 120 at a later time when the user 105 does not recall where the item was placed and/or when the item has been moved.

As shown in FIG. 1B, the system 110 provides guidance to the user 105 to the item of interest at its approximate current location, the location 123, by projecting a location image 150 in the environment 100. In some examples, the location image 150 is a light beam illuminating the location 123, The location image 150 may also include various colors to highlight the location 123, an image of the tracked item of interest (e.g. a projected image of keys), a sequence of projections (e.g., flashing image), etc. In some examples, the location image 150 is projected towards the last known location or approximate location of the item of interest 120. For example, the item of interest may not be in direct view of the projector 112 in the environment 100 (e.g., behind a curtain, covered by a magazine, behind a shelf, etc.), thus the system 110 will illuminate the approximate location of the items which provides a general or approximate location of the item to the user 105.

In some examples, the user 105 may not be able to view the location image 150. For example, in FIG. 1B, the user 105 is blocked from viewing the location 123 and the location image 150 by a wall. To provide guidance to the user 105, the system 110 may also project at least one guidance image, such as a guidance image 160, in the environment 100 in order to provide the user 105 directions to the item of interest 120. In some examples, the guidance image 160 may include one or more items such as an arrow 165 to direct or provide a path to the user 105 towards the item of interest 120. Additionally, in some examples, as the user 105 reaches the location 123, the system 110 provides a visual indication to the user 105 that the user has reached the item of interest 120. For example, turning the location image 150 to a different color or providing flashing light in the location image 150, etc.

In some examples, the system 110 may also provide projected images for each of the known locations of the item of interest over time. For example, the tracked locations, locations 122 and 123 may be illuminated as well as the tracked location 121*b* (e.g., associated with the user 105) is also illuminated. These projections may be different from the location image 150 in order to provide a distinction between the tracked locations and a current location of the item of interest 120. While described in relation to a single item of interest in FIGS. 1A-1B, multiple projections from the system 110 may also be used to track multiple items of interest in an environment.

Figure 2A:
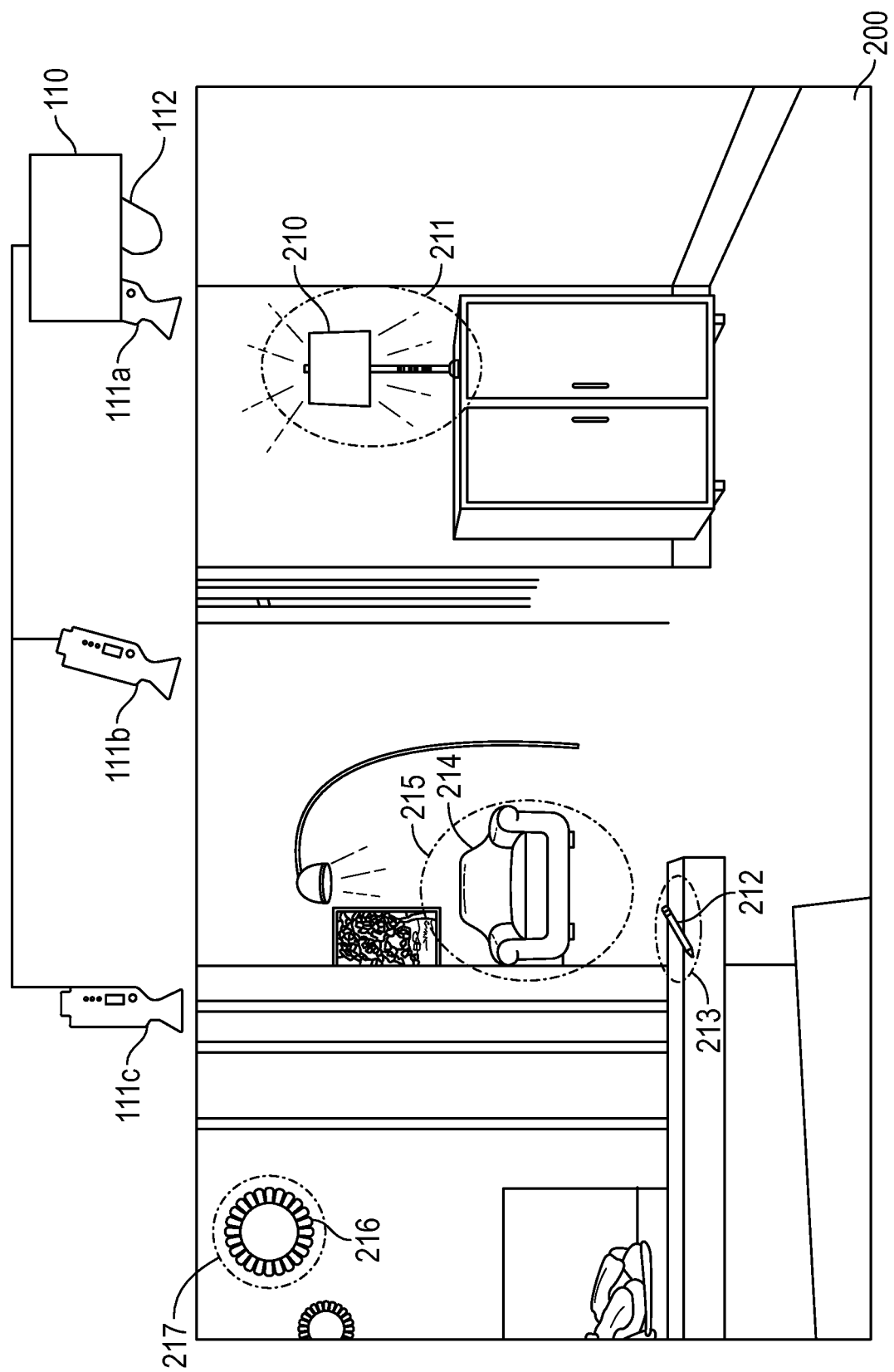
FIGS. 2A-2B illustrate an example environment with an image projection system and multiple items of interest, according to embodiments described herein.
Figure 2B:
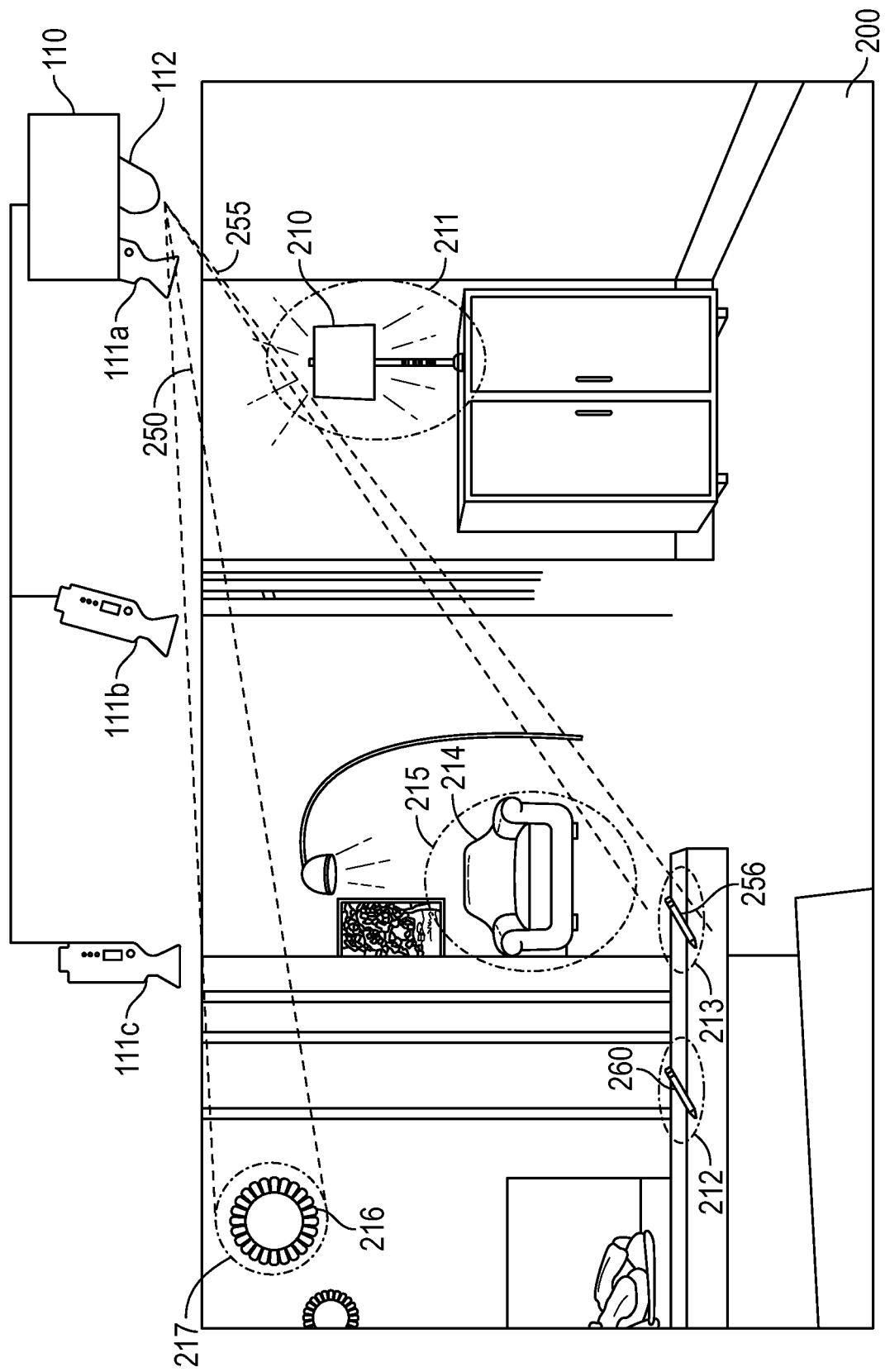

FIGS. 2A-2B illustrate an example environment 200 with an image projection system (e.g., the system 110), and multiple items of interest, according to embodiments described herein. In some examples, the environment 200 includes multiple items of interest such as items 210, 212, 214, and 216. In some examples, these items are similar to the item of interest described in relation to FIGS. 1A-1B, and are tracked by the system 110 through the environment 200. In some examples, the items 210, 212, 214, and 216 are in locations tracked for continuity. For example, the item 210 is in location 211, item 212 is in location 213, item 214 is in location 215 and item 216 in location 217. The locations 211, 213, 215 and 217 may be a desired location for each of the items such that if the items are moved from the desired location, the system 110 may project location images back onto the desired location. For example, during a home remodel, furniture etc. may be moved from a desired location, and the system 110 will indicate the previous or desired locations of the moved furniture. In another example, the environment 200 is a production set where continuity is desired between scenes and between various takes of a scene. The system 110 tracks the location of each of the items in the environment 200 and projects location images to ensure that the items are located in the appropriate location for consistency.

For example, as show in FIG. 2B, the item 212 is in a location 260, different from the desired location 213 shown in FIG. 2A. While a minor change, when filming the environment 200, the moving pencil may be noticeable to a viewer. The system 110 projects a location image 255 which may include an item depiction 256 on the location 213 to indicate that the item 212 should be placed in the location 213 and in the same orientation as the item depiction 256. In some examples, the system 110 projects location images for each of the plurality of items of interest (e.g., both the location image 255 for the item 212 and a projection 250 for the item 216 is in location 217), such that a person in the environment 200 may place the various items in the correct location or visually ensure the location of the items is correct.

In some examples, the various configurations of the items in the environment 200 are detected by the system 110 and the location image 255 is updated based on the configuration. An item configuration may include a physical orientation of an item of interest. The item configuration may also include an arrangement/position of the item within an environment and/or a relative position of the item (e.g., location relative to locations of other items within an environment, etc.). As an item configuration changes, the location image 255 may be updated. For example, when the item 212 is placed to match the item depiction 256, the location image 255 may update to change colors (e.g., change from a red or yellow color indicating an incorrect location and/or orientation to a green color indicating a correct location and orientation) or provide another visual indication that the item 212 is in the location 213 in a correct orientation. The items of interest in FIGS. 1A-2B may also be associated with other projectable images in addition to the location image as described in relation to FIGS. 3, 4A and 4B.

Figure 3:
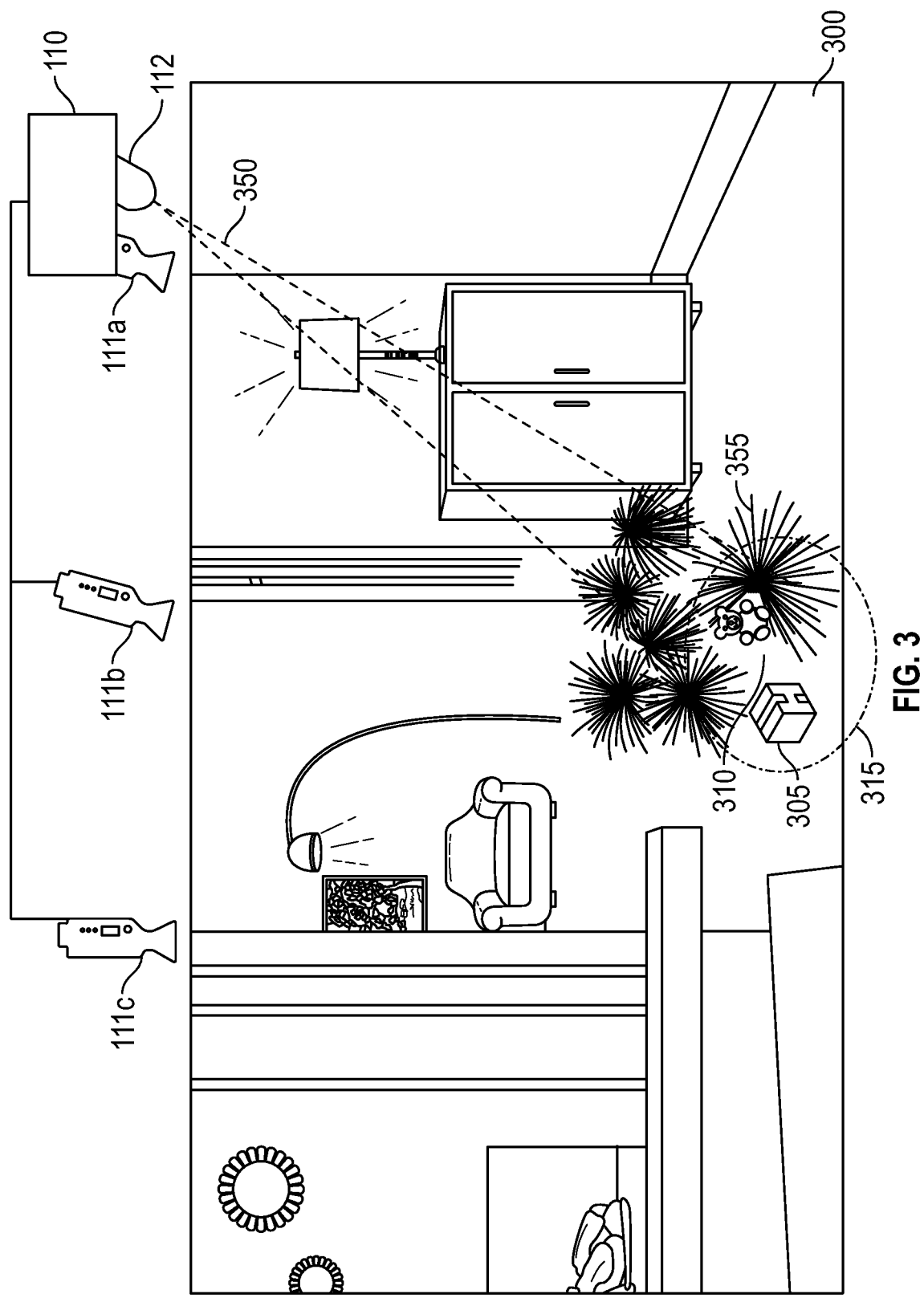
FIG. 3 illustrates an example environment with an image projection system and a projectable image, according to embodiments described herein.

FIG. 3 illustrates an example environment 300 with an image projection system (e.g., system 110), and a projectable image, according to embodiments described herein. The environment 300 includes items of interest such as an item 310 and an associated item 305. In some examples, the item 310 is a toy and the associated item 305 is a package for the toy. The system 110 receives images from one or more of the cameras 111*a*-111*c* and tracks the location and configuration of the item 310 and the associated item 305. For example, at a first time, the item 310 may be contained within the associated item 305 (e.g., the toy is inside the packaging). As the locations and configurations of the item 310 and associated item 305 changes (e.g., the toy is taken out of the packaging), a configuration of the items changes and a configuration 315 is detected by the system 110, where the configuration 315 is associated with projectable images including a projectable image 350. For example, as the toy is unboxed the system 110 display a visual effect 355, for example, a fireworks show, in the projectable image 350. While described in relation to one item configuration and projectable image in the FIG. 3, other examples may include multiple configurations and multiple projectable images such that as a user moves items within an environment, the system 110 updates and changes the projectable image according to various configurations.

Figure 4A:
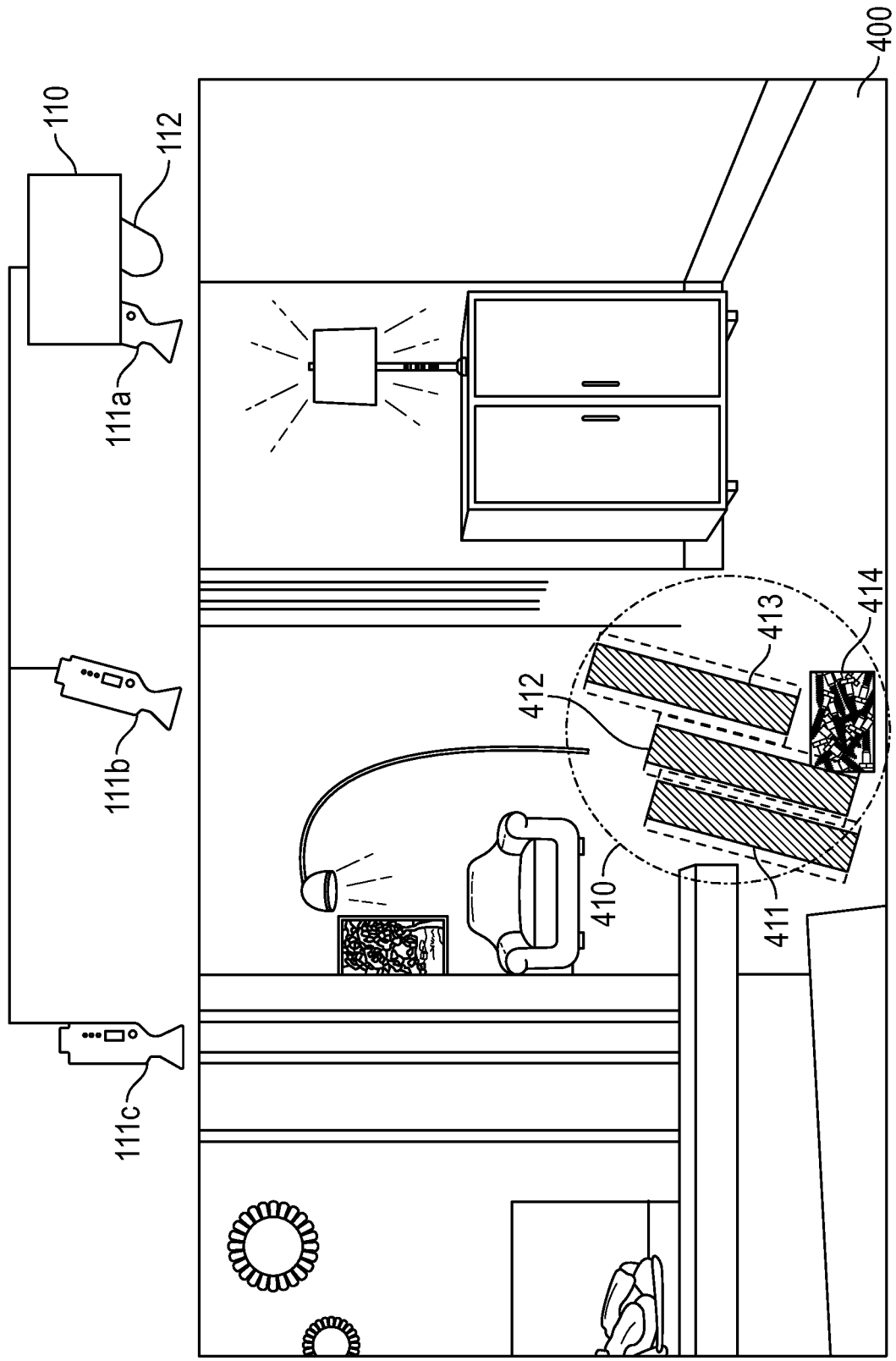
FIGS. 4A-4B illustrates an example environment with an image projection system and multiple projectable images, according to embodiments described herein.
Figure 4B:
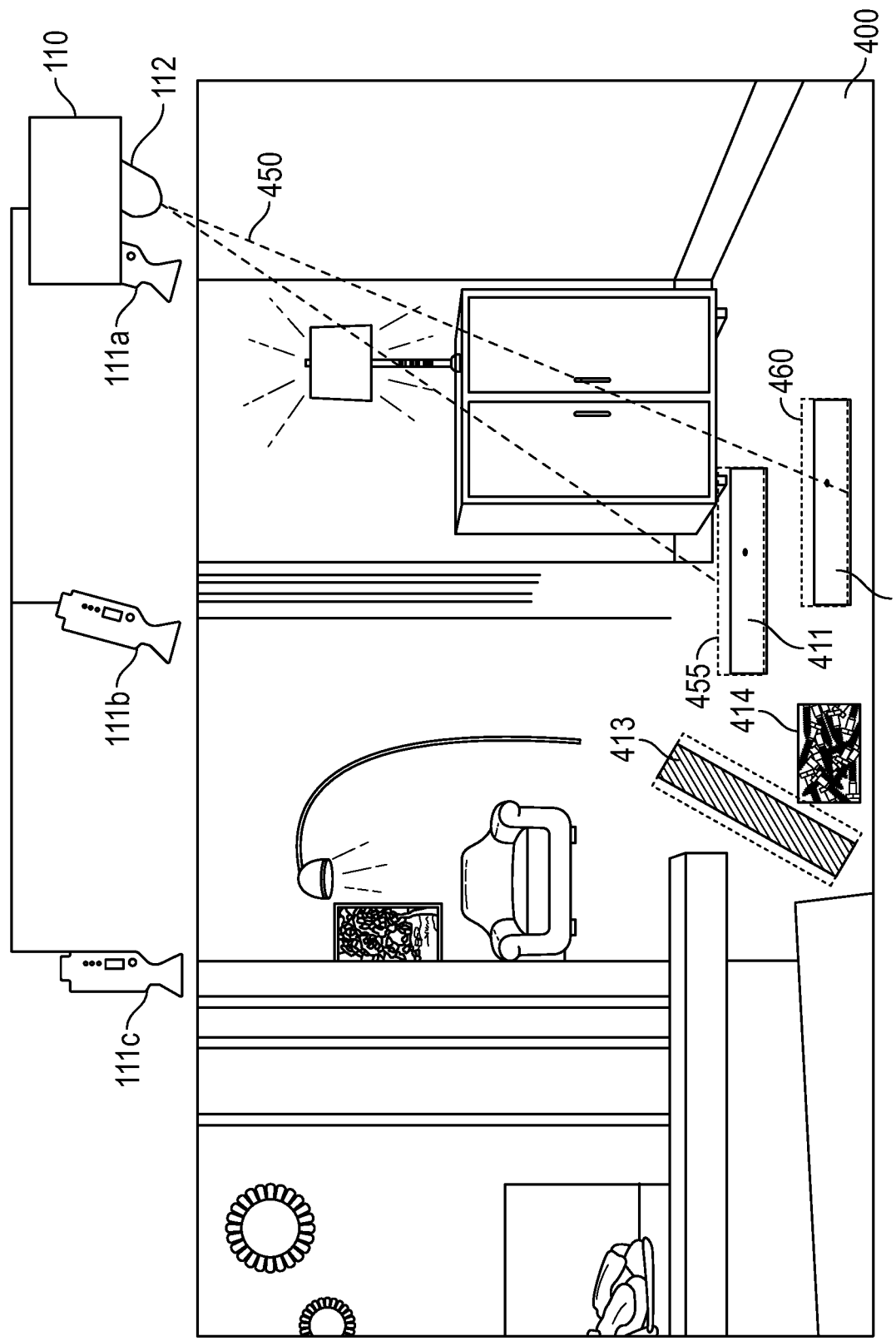

FIGS. 4A-4B illustrates an example environment 400 with an image projection system (e.g., the system 110), and multiple projectable images, according to embodiments described herein. The environment 400 includes multiple items of interest that may be associated with an activity or sequence of actions of a user such as a game, instructions to build something, etc. For example, a person in the environment 400 may desire to assemble furniture. The system 110 processes images of the environment 400 to identify items 411-414 in an item configuration 410. The item configuration 410 may include a plurality of locations for the items 411-414 as well a plurality of relative locations between the items 411-414. The item configuration 410 may also include one or more orientations associated with the items 411-414. While not shown in FIG. 4A, the system 110 may project projectable images on the items of interest in order to identify the items, etc. As the item configuration 410 is identified by the system 110, the system determines a projectable image of the configuration which may be a next step in the assembly of the furniture.

FIG. 4B illustrates a projectable image 450 in the environment 400 from the system 110 depicting a next step in an assembly process for the items of interest 411-414. The projectable image 450 includes guides 455 and 460 which provide visual indications to the user to align parts of the furniture (among other visual indications) in the projectable image 450. As the items are moved into the projectable image, a next configuration is determined and a next step in the assembly process is displayed by the system 110.

Figure 5:
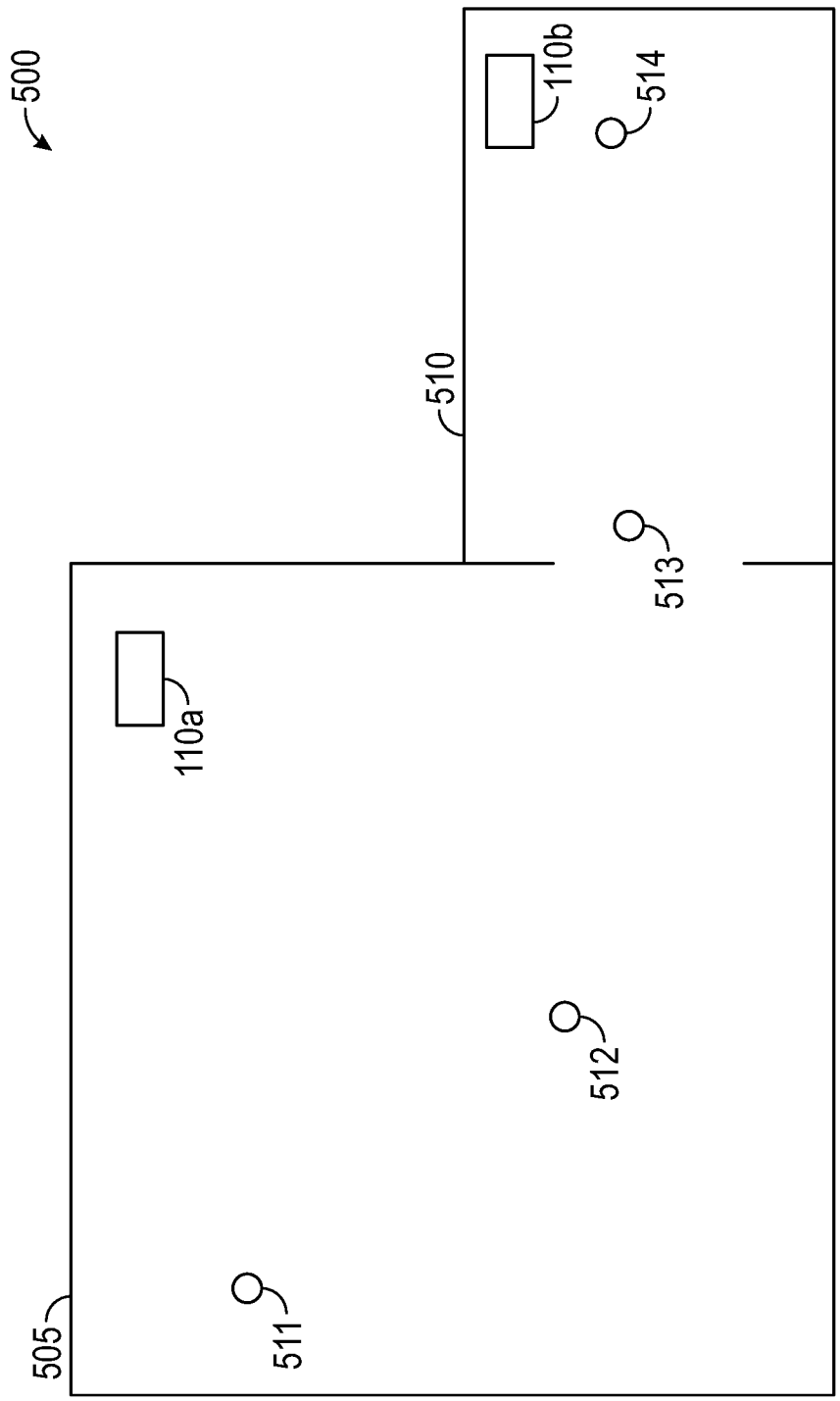
FIG. 5 illustrates an example environment with multiple image projection systems, according to embodiments described herein.

FIG. 5 illustrates an example environment 500 with multiple image projection systems, according to embodiments described herein. The environment 500 includes multiple areas or rooms, such as rooms 505 and 510, where an associated system 110 is located in each room, such as system 110*a* in the room 505 and a system 110*b* in the room 510. The systems 110*a* and 110*b* may be in communication with each other such that as an item of interest crosses the environment 500 from one room to another, the item may be tracked across both rooms. For example, an item of interest is at location 511 at a first time, a location 512 at a second time, a location 513 at a third time and a location 514 at a fourth time. The system 110a tracks the item when it is at the locations 511 and 512. The system 110b tracks the item when the item is at locations 512, 513, and 514. In some examples, the systems 110a and 110b may negotiate to determine which system tracks the item when it is within the field of view of both systems (e.g., location 512). In another example, when either of the systems 510a or 510b is no longer able to track an item (e.g., the item is out of view of the system), the system may hand off tracking to a neighboring system.

For example, when the item is at the location 513, the system 110a, which tracks the item at locations 511 and 512, determines that the item of interest is not present in the environment within the field of view of the system 110a (e.g., the room 505), updates a current location of the item of interest to unknown or a last known location, and transmits an item of interest notification to one or more neighboring image projection systems, such as the system 110b, to hand off tracking of the item of interest.

Figure 6:
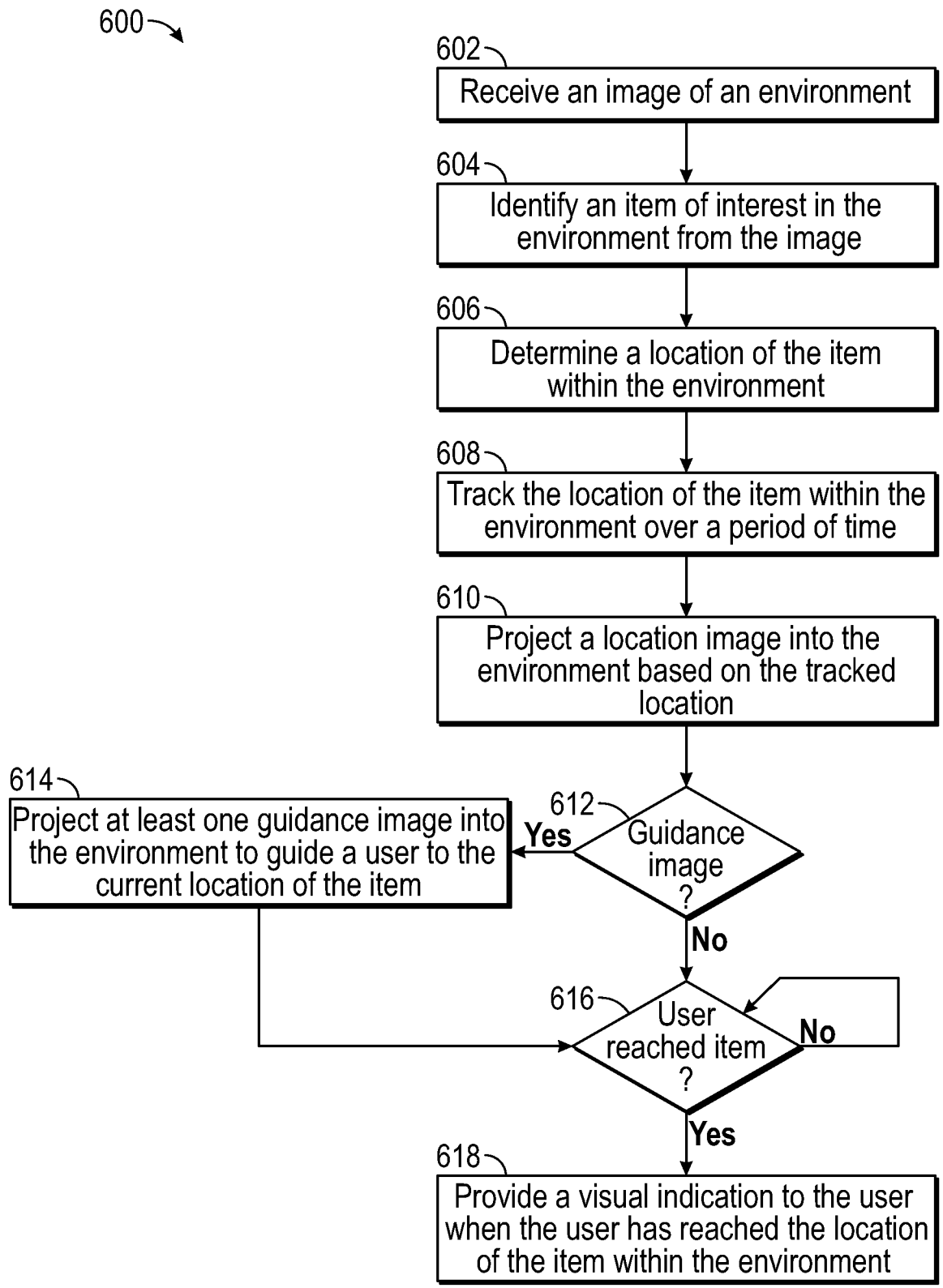
FIG. 6 is flowchart of a method for tracking an item of interest in an environment, according to embodiments described herein.

FIG. 6 is flowchart of a method 600 for tracking an item of interest in an environment, according to embodiments described herein. The methods described in relation to FIGS. 6-9 are performed by the system as shown in the FIGS. 1A-5 (including systems 110a and 110b of FIG. 5). A block diagram of system 110 is also described in relation to FIG. 10. For ease of discussion reference will be made to FIGS. 1A-5 and 10 throughout the discussion of the methods of FIGS. 6-9. As shown in FIG. 10, the system 110 may include a computing device or computer 1000 embodied as an all in one image capture and projection system, where the computer 1000 executes the functions of the system 110 shown in FIGS. 1A-5, and performs the methods described in relation to FIG. 6-9. The computer 1000 is shown in the form of a general-purpose computing device. The components of computer 1000 may include, but are not limited to, one or more processing units or processors 1005, a system memory, memory 1010, a storage 1020, a bus 1050 that couples various system components including the memory 1010 and storage 1020 to the one or more processors 1005 along with an external network interface 1030, connected to the network 1060 as well user device 1070 and additional systems 1065 via the network 1060, and input/output components 1040.

Referring back to FIG. 1, method 600 begins at block 602 where the system 110 receives an image of an environment around the system 110. For example, as shown in FIG. 1A, the system 110 receives at least one image of the environment 100 from the cameras 111a-111c. In some examples, the image received by the system 110 is a still image, a collection of images, or video images of the environment 100, 200, 300, 400, or 500.

At block 604 the system 110 identifies at least one item of interest in the environment from the image. In some examples, the system may use a plurality of image processing and image recognition techniques to process the image of the environment received at block 602 to identify an item of interest. In some examples, items of interest may be selected for display by a user, such as the user 105 via interaction with the system 110 or a user device, such as user device 1070 in FIG. 10, which is in communication with the system 110. Items of interest may include preset or predetermined items of interest stored on the system 110 or may be items of interest identified by the user to the system 110 as described in relation to method 700 of FIG. 7.

Figure 7:
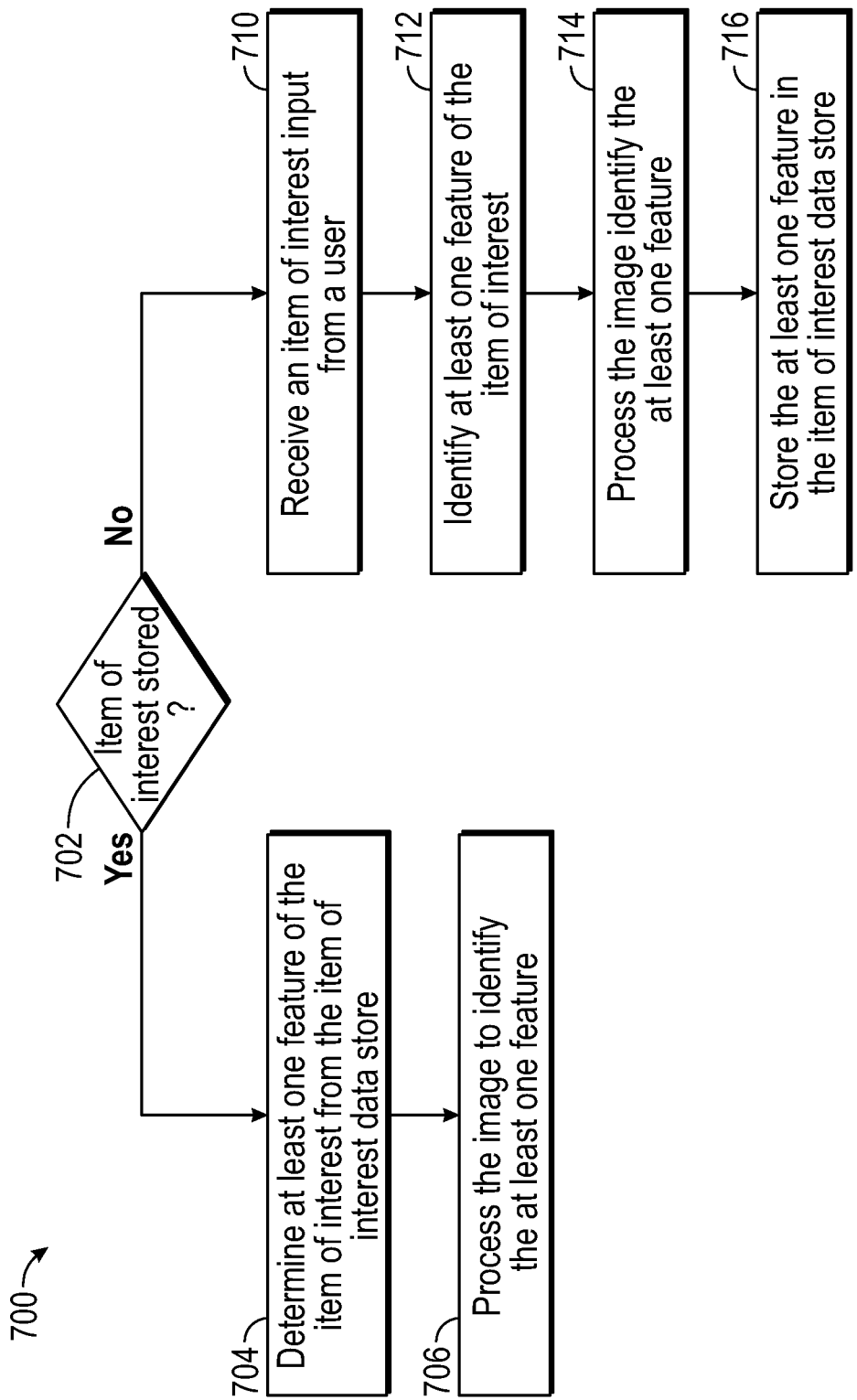
FIG. 7 is flowchart of a method for identifying at least one item of interest in the environment, according to embodiments described herein.

FIG. 7 is flowchart of the method 700 for identifying at least one item of interest in the environment, according to embodiments described herein. Method 700 begins at block 702 where the system 110 determines from an image data store whether there is an associated item of interest stored in an the item of interest data store. For example, the system 110 may access items of interest 1021 of FIG. 10 to determine whether there are any items of interests stored within the system 110.

In an example, where there are items of interest previously stored in the system 110, the method 700 proceeds to block 704 where the system 110 determines at least one feature of the item of interest from an item of interest data store (e.g., the items of interest 1021) and processes the image to identify the at least one feature in the image indicating an the item of interest is present in the image at block 706. For example, the at least one feature may include a feature used to identify keys as the item of interest 120 described in relation to FIG. 1A. In some examples, the item of interest may be identified using a plurality of features of the items of interest used in typical image processing and recognition such as described in relation to FIG. 3 above. In another example, the items of interest may include physical dimensions and other characteristics used by the system 110 to identify the items as described in relation to FIG. 4 above.

In an example, where items of interest are not stored in the item of interest data store, the method 700 proceeds to block 710 where the system 110 receives an item of interest input from a user. For example, a user may interact with the system 110 via voice, a user device in communication with the system 110, and/or a user interface in communication with the system 110, and indicate that the user would like to track an item of interest. While described in relation to decision in block 702, the processes in block 710-716 may also be initiated by a user prior to an item of interest determination in the block 702.

In some examples, the item of interest input is an image of the item, description of the item, or an image captured by the cameras 111a-111c of the item and may be provided through a scanning process onboard the system 110. The user may also input various parameters to the system, either via interactions with the system 110 or the user device 1070.

At block 712, the system 110 identifies at least one feature of the item of interest, where the at least one feature may be used in image recognition processes to identify the item. The at least one feature may also be used in processing the image received in the block 602 to identify the at least one feature in the image indicating the item of interest is present in the image. For example, with reference to FIG. 1A, the user 105 interacts with the system 110 to track the item of interest 120, such that when the user enters the environment 100, the system 110, using images received from the cameras 111a-111c tracks the item of interest 120 through the environment 100. At block 716, the system 110 stores the at least one feature in the item of interest data store for future use to identify the item of interest.

Returning back to FIG. 6, at block 606, the system 110 determines, from the image, a location of the item within the environment. For example, as shown in FIG. 1A, the item of interest 120 is at the location 121a at a first time. The system 110 uses image processing and other information collected by the cameras 111a-111c to determine the location of the item of interest 120 in the environment 100.

At block 608, the system 110 tracks the location of the item of interest within the environment over a period of time. For example, the system 110 tracks the item of interest 120 across the environment from location 121a to 122 and 123 over time. In some examples, the tracking is accomplished using several images received over the period of time at the system 110, as described in relation to method 800 in FIG. 8.

At block 610, the system 110 projects, from the projector 112, a location image into the environment based on the tracked location. For example, as shown in FIG. 1B, the system 110 projects the location image 150 onto the location 123 to indicate where the item is currently located. In some examples, the system 110 also projects a plurality of location images for each of a plurality of tracked locations of the item of interest over the period of time. For example, the system 110 may track additional items of interest in addition to the item of interest 120 and project additional location images on those locations.

At block 612, the system 110 determines whether a guidance image is available. In an example, where the system 110 has a guidance image associated with the item of interest, the method 600 proceeds to block 614, where the system 110 projects at least one guidance image into the environment to guide a user to the current location of the item. For example, as shown in FIG. 1B, the system 110 projects the guidance image 160 associated with the item of interest 120 and the location 123. In some examples, the guidance image 160 includes the arrow 165 which provides an indication of the location 123 to the user 105.

At block 616, the system 110 begins an iterative process to determine whether a user has reached the location of the item. For example, as shown in FIG. 1B, the user 105 is not currently at the location 123. The system 110 may use additional images received from the cameras 111a-111c to track the location of the user 105 as the user moves through the environment 100. In some examples, the system 110 may provide additional guidance to the user 105 to the location 123 using additional guidance images or altering the location image 150 to illuminate the location 123 more brightly, using a different color, etc.

When the user has reached the item of interest, the method 600 proceeds to block 618, where the system 110 provides a visual indication to the user. For example, the system 110 may alter location image 150 to a different color or provide a flashing light in the location image 150, etc. indicating the user has reached the item of interest 120.

Figure 8:
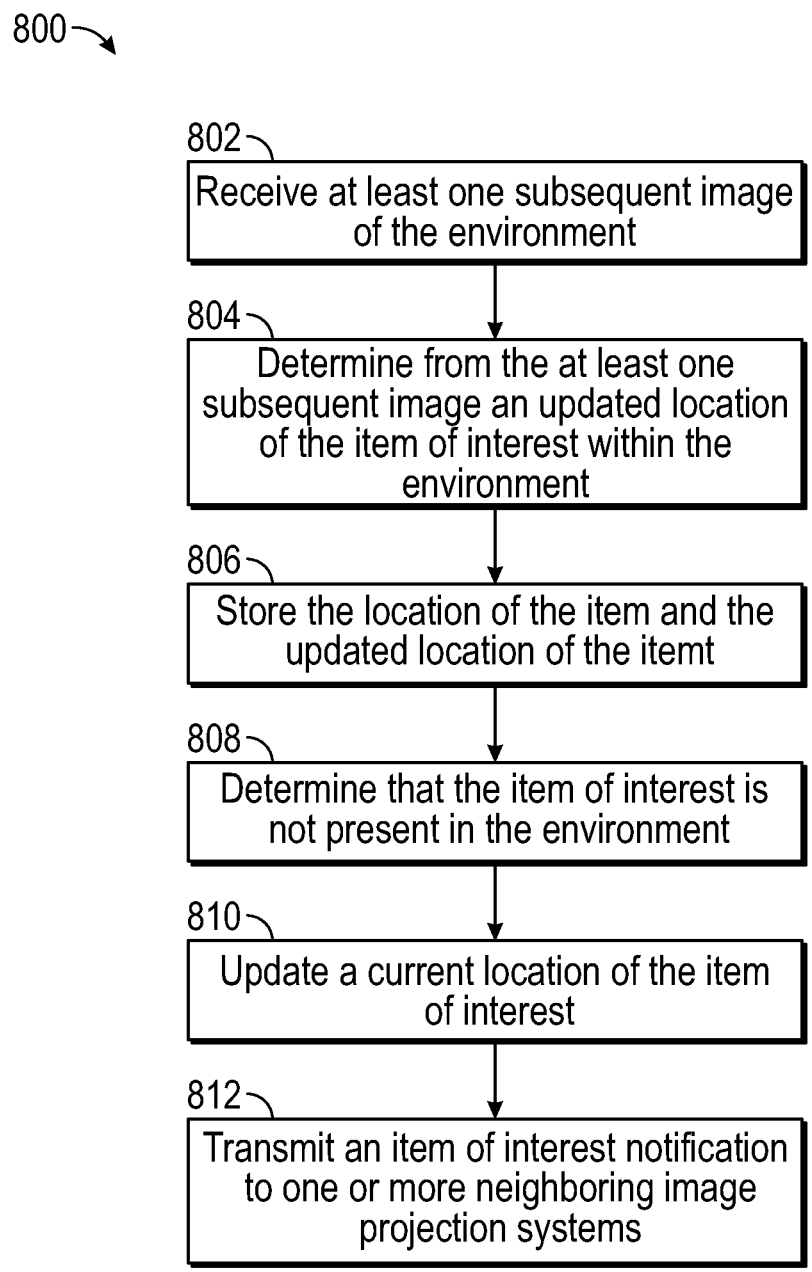
FIG. 8 is flowchart of a method for tracking an item of interest in an environment, according to embodiments described herein

FIG. 8 is flowchart of the method 800 for tracking an item of interest in an environment, according to embodiments described herein. The method 800 begins at block 802 where the system 110 receives at least one subsequent image of the environment. For example, the system 110 receive additional images of the environment 100 described in relation to FIGS. 1A-B.

At block 804, the system determines from the at least one subsequent image an updated location of the item of interest within the environment. For example, the system determines that the item of interest 120 is located at the locations 122 and 123 at respective times. At block 806, the system 110 stores the location of the item of interest and the updated location of the item of interest. For example, the system 110 stores/updates the tracked location in locations 1023 described in FIG. 10.

In some examples, an item of interest may be moved from an environment as detected by the system 110 as described above in relation to FIG. 5. For example at block 808, the system 110 determines that the item of interest is not present in the environment. In this example, the system 110 at block 810, updates a current location of the item of interest to indicate the location is unknown and/or a last known location and transmits an item of interest notification to one or more neighboring image projection systems at block 812.

For example, the system 110a transmits a hand off notification to the system 110b to allow the system 110b to begin tracking the item of interest.

Figure 9:
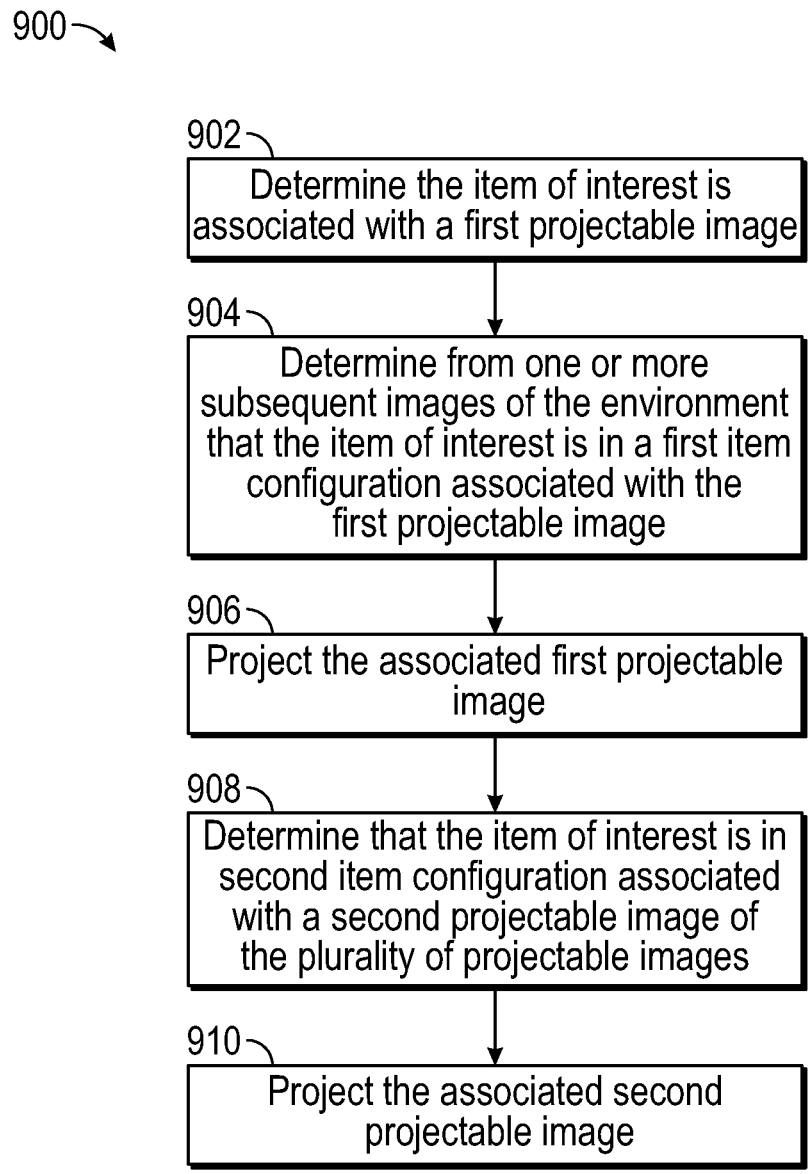
FIG. 9 is flowchart of a method for projecting a projectable image in an environment, according to embodiments described herein.
Figure 10:
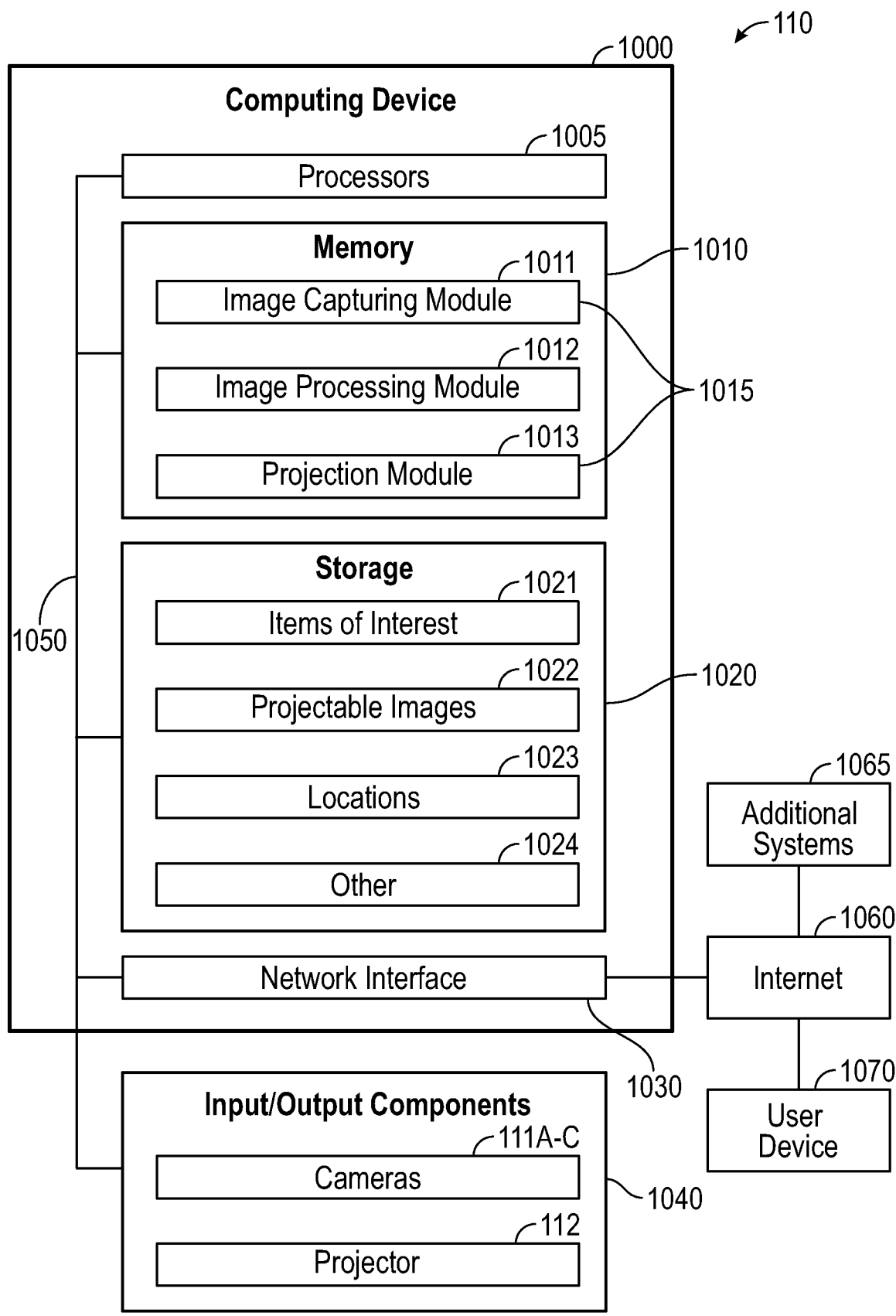
FIG. 10 illustrates a block diagram of an image projection system, according to embodiments described herein.

FIG. 9 is flowchart of a method 900 for projecting a projectable image in an environment, according to embodiments described herein. Method 900 begins at block 902 where the system 110 determines the item of interest is associated with a first projectable image of a plurality of projectable images. For example, the associated item 305 and the item 310 may be associated with a plurality of projectable images stored in the projectable images 1022. In some examples, each projectable image in the plurality of projectable images is associated with an item configuration. For example, the projectable image 350 is associated with a configuration of the associated item 305 (e.g., out of an opened box).

At block 904, the system 110 determines from one or more subsequent images of the environment that the item of interest is in a first item configuration associated with the first projectable image of the plurality of projectable images and projects the first projectable image at block 906. For example, the system 110 determines that the item 310 is unpacked from the associated item 305 and projects the image 350 including the visual effect 355.

In some example, at block 908 the system 110 determines from one or more additional subsequent images of the environment, that the item of interest is in a second item configuration associated with a second projectable image of the plurality of projectable images and projects the second projectable image at block 910. For example, in the items of interest 411 and 416 are determined to be in a first configuration (e.g., unpacked) in FIG. 4A and the system 110 projects the image 450 including the guides 455 and 460 in FIG. 4B in order to provide a guide to a user in the environment 400.

FIG. 10 illustrates a block diagram of an image projection system, according to embodiments described herein. The input/output components 1040 include at least camera 111a and projector 112. The input/output components 1040 may also optionally include cameras 111b-c. The system 110 is connected to additional systems 1065 (e.g., systems 110a and 110b) and user device 1070 through the network 1060. In some embodiments, system 110 is distributed and includes a plurality of discrete computing devices that are connected through wired or wireless networking.

Memory 1010 may include a plurality of program modules 1015 for performing various functions related to capturing virtual and real world images, described herein. The program modules 1015 generally include program code that is executable by one or more of the processors 1005. As shown, program modules 1015 include image capturing module 1011, image processing module 1012, and projection module 1013. In some examples, the program modules 1015 may be distributed and/or cloud based applications/modules. Additionally, storage 1020 may include media for items of interest 1021, projectable images 1022, locations 1023, and other information 1024. The information stored in storage system 1020 may be updated and accessed by the program modules 1015 described herein.

As described above various computing components may be included to perform the methods described herein. For example, bus 1050 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, computer 1000 typically includes a variety of computer system readable media. Such media may be any available media that is accessible by computer 1000, and it includes both volatile and non-volatile media, removable and non-removable media.

The memory 1010 can include computer system readable media in the form of volatile memory, such as random access memory (RAM) and/or cache memory. Computer 1000 may further include other removable/non-removable, volatile/non-volatile computer system storage media. In some examples, storage system 1020 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1050 by one or more data media interfaces.

As depicted and described above, memory 1010 may include at least one program product having a set (e.g., at least one) of program modules 1015 that are configured to carry out the functions of embodiments of the invention. Computer 1000 may further include other removable/non-removable volatile/non-volatile computer system storage media. In some examples, storage 1020 may be included as part of memory 1010 and may typically provide a non-volatile memory for the networked computing devices, and may include one or more different storage elements such as Flash memory, a hard disk drive, a solid state drive, an optical storage device, and/or a magnetic storage device.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving an image of a physical environment;
   identifying, from the image, an item of interest in the physical environment, the item of interest being inanimate;
   determining, from the image, an orientation and a first location of the item of interest within the physical environment at a first time;
   tracking a location of the item of interest within the physical environment over a period of time in which the item of interest is moved; and
   projecting, using a projector, a location image into the physical environment that indicates to a user the first location of the item of interest during the period of time, wherein the location image includes a depiction of the item of interest in the determined orientation.

2. The method of claim 1, further comprising:
   projecting at least one guidance image into the physical environment to guide the user to the first location of the item of interest; and
   providing a visual indication to the user when the user has reached the first location of the item of interest within the physical environment.

3. The method of claim 1, wherein identifying the item of interest in the physical environment comprises:
   receiving input relating to the item of interest from the user;
   identifying at least one feature of the item of interest; and
   processing the image using the at least one feature to identify the item of interest.

4. The method of claim 1, wherein identifying the item of interest in the physical environment comprises:
   determining at least one feature of the item of interest from an item of interest data store; and
   processing the image to identify the at least one feature in the image indicating the item of interest is present in the image.

5. The method of claim 1, wherein projecting the location image comprises:
   projecting, using the projector, a plurality of additional location images for each of a plurality of tracked locations of the item of interest over the period of time.

6. The method of claim 1, further comprising:
   determining the item of interest is associated with a first projectable image of a plurality of projectable images, wherein each projectable image in the plurality of projectable images is associated with an item configuration, wherein the item configuration comprises at least one of:
      one or more locations for a plurality of items in the first projectable image;
      one or more orientations associated with the plurality of items; and
      one or more relative positions between the plurality of items;
   determining from one or more subsequent images of the physical environment that the item of interest is in a first item configuration associated with the first projectable image of the plurality of projectable images; and
   projecting the first projectable image.

7. The method of claim 6, further comprising:
   determining, from one or more additional subsequent images of the physical environment, that the item of interest is in a second item configuration associated with a second projectable image of the plurality of projectable images; and
   projecting the second projectable image.

8. The method of claim 1, wherein tracking the location of the item of interest within the physical environment comprises:
   receiving at least one subsequent image of the physical environment;
   determining from the at least one subsequent image an updated location of the item of interest within the physical environment; and
   storing the first location of the item of interest and the updated location of the item of interest.

9. The method of claim 1, further comprising:
   determining that the item of interest is not present in the physical environment;
   updating the location of the item of interest; and
   transmitting a hand-off notification relating to the item of interest to one or more neighboring image projectors.

10. The method of claim 1, wherein:
    the first location is a desired location of the item of interest within the physical environment;
    the method further comprises determining, from the image, a desired orientation of the item of interest at the desired location; and
    the location image indicates to the user the desired location of the item of interest and the desired orientation of the item of interest at the desired location.

11. A system, comprising:
    a processor; and
    a memory comprising instructions which, when executed on the processor, performs an operation, the operation comprising:
       receiving an image of a physical environment;
       identifying, from the image, an item of interest in the physical environment from the image, the item of interest being inanimate;
       determining, from the image, an orientation and a first location of the item of interest within the physical environment at a first time;
       tracking a location of the item of interest within the physical environment over a period of time in which the item of interest is moved; and
       projecting, using a projector, a location image into the physical environment that indicates to a user the first location of the item of interest during period of time, wherein the location image includes a depiction of the item of interest in the determined orientation.

12. The system of claim 11, wherein the operation further comprises:
projecting at least one guidance image into the physical environment to guide the user to the first location of the item of interest; and
providing a visual indication to the user when the user has reached the first location of the item of interest within the physical environment.

13. The system of claim 11, wherein identifying the item of interest in the physical environment comprises:
receiving an input relating to the item of interest from the user;
identifying at least one feature of the item of interest; and
processing the image using the at least one feature to identify the item of interest.

14. The system of claim 11, wherein identifying the item of interest in the physical environment comprises:
determining at least one feature of the item of interest from an item of interest data store; and
processing the image to identify the at least one feature in the image indicating the item of interest is present in the image.

15. The system of claim 11, wherein projecting the location image comprises:
projecting, using the projector, a plurality of additional location images for each of a plurality of tracked locations of the item of interest over the period of time.

16. The system of claim 11, wherein the operation further comprises:
determining the item of interest is associated with a first projectable image of a plurality of projectable images, wherein each projectable image in the plurality of projectable images is associated with an item configuration, wherein the item configuration comprises at least one of:
one or more locations for a plurality of items in the first projectable image;
one or more orientations associated with the plurality of items; and
one or more relative positions between the plurality of items;
determining from one or more subsequent images of the physical environment that the item of interest is in a first item configuration associated with the first projectable image of the plurality of projectable images;
projecting the first projectable image;
determining, from one or more additional subsequent images of the physical environment, that the item of interest is in a second item configuration associated with a second projectable image of the plurality of projectable images; and
projecting the second projectable image.

17. The system of claim 11, wherein tracking the location of the item of interest within the physical environment comprises:
receiving at least one subsequent image of the physical environment;
determining from the at least one subsequent image an updated location of the item of interest within the physical environment; and
storing the first location of the item of interest and the updated location of the item of interest.

18. The system of claim 11, wherein the operation further comprises:
determining that the item of interest is not present in the physical environment;
updating the location of the item of interest; and
transmitting a hand-off notification relating to the item of interest to one or more neighboring image projection systems.

19. A non-transitory computer-readable medium comprising computer-readable program code embodied therewith, the computer-readable program code is configured to perform, when executed by a processor, an operation, the operation comprising:
receiving an image of a physical environment;
identifying, from the image, an item of interest in the physical environment, the item of interest being inanimate;
determining, from the image, an orientation and a first location of the item of interest within the physical environment at a first time;
tracking a location of the item of interest within the physical environment over a period of time in which the item of interest is moved; and
projecting, using a projector, a location image into the physical environment that indicates to a user the first location of the item of interest during the period of time, wherein the location image includes a depiction of the item of interest in the determined orientation.

20. The non-transitory computer-readable medium of claim 19, wherein the operation further comprises:
determining the item of interest is associated with a first projectable image of a plurality of projectable images, wherein each projectable image in the plurality of projectable images is associated with an item configuration, wherein the item configuration comprises at least one of:
one or more locations for a plurality of items in the first projectable image;
one or more orientations associated with the plurality of items; and
one or more relative positions between the plurality of items;
determining from one or more subsequent images of the physical environment that the item of interest is in a first item configuration associated with the first projectable image of the plurality of projectable images;
projecting the first projectable image;
determining, from one or more additional subsequent images of the physical environment, that the item of interest is in a second item configuration associated with a second projectable image of the plurality of projectable images; and
projecting the second projectable image.

21. The non-transitory computer-readable medium of claim 19, wherein tracking the location of the item of interest within the physical environment comprises:
receiving at least one subsequent image of the physical environment;
determining from the at least one subsequent image an updated location of the item of interest within the physical environment; and
storing the first location of the item of interest and the updated location of the item of interest.

* * * * *